US008422827B2

(12) United States Patent
Ishii et al.

(10) Patent No.: US 8,422,827 B2
(45) Date of Patent: Apr. 16, 2013

(54) IMAGE CORRECTION APPARATUS AND IMAGE CORRECTION METHOD

(75) Inventors: Yasunori Ishii, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 12/988,890

(22) PCT Filed: Feb. 22, 2010

(86) PCT No.: PCT/JP2010/001115
§ 371 (c)(1),
(2), (4) Date: Oct. 21, 2010

(87) PCT Pub. No.: WO2010/098054
PCT Pub. Date: Sep. 2, 2010

(65) Prior Publication Data
US 2011/0033132 A1 Feb. 10, 2011

(30) Foreign Application Priority Data
Feb. 25, 2009 (JP) .................................. 2009-042741

(51) Int. Cl.
*G06K 9/40* (2006.01)
(52) U.S. Cl.
USPC ......................................... 382/299; 382/275
(58) Field of Classification Search .................. None
See application file for complete search history.

(56) References Cited

U.S. PATENT DOCUMENTS
6,021,221 A * 2/2000 Takaha .......................... 382/199
2001/0008418 A1 7/2001 Yamanaka et al.
(Continued)

FOREIGN PATENT DOCUMENTS
EP 1 708 136 A1 10/2006
JP 2001-197355 7/2001
(Continued)

OTHER PUBLICATIONS
Ety Navon, Ofer Miller, Amir Averbuch, Color image segmentation based on adaptive local thresholds, Image and Vision Computing, vol. 23, Issue 1, Jan. 1, 2005, pp. 69-85, ISSN 0262-8856, 10.1016/j.imavis.2004.05.011. (http://www.sciencedirect.com/science/article/pii/S0262885604001891).*

(Continued)

*Primary Examiner* — Stephen R Koziol
*Assistant Examiner* — Amandeep Saini
(74) *Attorney, Agent, or Firm* — Wenderoth, Lind & Ponack, L.L.P.

(57) ABSTRACT

An input image containing multiple kinds of blur is corrected without using multiple images, resulting in a target image with less blur than the input image. An image correction apparatus (100) for correcting an input image to generate a target image with less blur than the input image is provided, which includes: an adaptive region division unit (110) that divides the input image into a plurality of adaptive regions based on pixel values of pixels included in the input image; a PSF interpolation unit (120) that interpolates a point spread function for a pixel located between representative pixels each representing a corresponding one of the adaptive regions, using a PSF representing characteristics of image blur calculated for each of the adaptive regions; and an image correction unit (130) that corrects the input image using the point spread functions available after the interpolation, so as to generate the target image.

12 Claims, 13 Drawing Sheets

U.S. PATENT DOCUMENTS

| | | | |
|---|---|---|---|
| 2003/0002746 A1 | 1/2003 | Kusaka | |
| 2005/0243350 A1* | 11/2005 | Aoyama | 358/1.9 |
| 2008/0175508 A1 | 7/2008 | Bando et al. | |
| 2009/0076754 A1* | 3/2009 | Bakin et al. | 702/81 |
| 2009/0174782 A1* | 7/2009 | Kahn et al. | 348/208.2 |

FOREIGN PATENT DOCUMENTS

| | | |
|---|---|---|
| JP | 2002-112099 | 4/2002 |
| JP | 2006-221347 | 8/2006 |
| JP | 2008-176735 | 7/2008 |

OTHER PUBLICATIONS

Yu-Wing Tai et al., *"Image/Video Deblurring using a Hybrid Camera"*, (CVPR2008), Feb. 2008.

Rob Fergus et al., *"Removing camera shake from a single Photograph"*, (SIGGRAPH2006), 2006.

Extended European Search Report issued Dec. 14, 2012 in corresponding European Application No. 10745941.4.

\* cited by examiner

IMAGE CORRECTION APPARATUS AND IMAGE CORRECTION METHOD

TECHNICAL FIELD

The present invention relates to image correction apparatuses which correct images captured with digital still cameras, security cameras, and the like, and particularly to an image correction apparatus which corrects blur in images.

BACKGROUND ART

In the case where a user captures an image of a subject with a camera, the captured image may have blur. This blur appearing on an image is roughly classified into two types, hand shake blur and motion blur. The hand shake blur indicates blur which is due to camera shake at the moment of pressing the shutter. The motion blur indicates blur which is due to movement of the subject while being photographed.

Characteristics of such hand shake blur and motion blur are represented by a point spread function (hereinafter referred to as PSF). The PSF indicates a function which shows the intensity distribution of a blurred or out-of-focus point image. FIGS. 14A and 14B illustrate the PSF. For example, as shown in FIG. 14A, an image 1003 represents a PSF which indicates deterioration from a focused image 1001 to an out-of-focus image 1002. Furthermore, as shown in FIG. 14B, an image 1006 represents a PSF which indicates deterioration from an unblurred image 1004 to an image 1005 that is blurred in the x direction.

By the way, in recent years, techniques for correcting hand shake blur (for example, electronic hand-shake blur correction and optical hand-shake blur correction) have been put into practice. Specifically, in the case of the optical hand-shake blur correction, hand movement at the time of shooting is estimated based on information from a sensor such as a gyroscope, for example. According to the estimated movement, a lens mechanism or a light-receiving unit sensor is then controlled to correct hand shake blur. In the case of the electronic hand-shake blur correction, a PSF is calculated based on information from a sensor such as a gyroscope, for example. The calculated PSF is then used to correct an image, thereby correcting hand shake blur. The PSF for hand shake blur corresponds to hand movement at the time of shooting and therefore is almost uniform in a whole image.

On the other hand, the PSF for motion blur corresponds to subject movement and therefore is often different from one region to another of an image. It is therefore difficult to correct motion blur in the same method as that used to correct hand shake blur.

In response to this, as a technique for correcting motion blur, a method has been proposed which uses a sequence of images with low resolutions captured using a high-speed shutter and an image with a high resolution captured using a low-speed shutter (refer to Non-Patent Literature 1, for example). In the method disclosed by the Non-Patent Literature 1, a movement of subject image is estimated by correlating pixels with each other among multiple images included in a sequence of low-resolution images with less blur captured using a high-speed shutter. Using the estimated movement of subject image, an image with more blur captured using a low-speed shutter is then corrected so that a high-resolution image with motion blur corrected is obtained.

As another technique for correcting motion blur, a method has been proposed which uses multiple images consecutively captured (refer to Patent Literature 1, for example). In the method disclosed by the Patent Literature 1, as in the method disclosed by the Non-Patent Literature 1, a movement (trajectory) of the subject is obtained based on multiple images consecutively captured, to thereby obtain one degradation function (for example, PSF) which indicates degradation characteristics at all the pixel positions of a target image. Using the degradation function thus calculated, an unblurred image is generated from the target image.

CITATION LIST

Patent Literature

[PTL 1]
Japanese Unexamined Patent Application Publication 2001-197355

Non Patent Literature

[NPL 1]
Image/Video Deblurring using a hybrid camera (Yu-Wing Tai, Hao Du, M. S. Brown, S. Lin CVPR2008)

SUMMARY OF INVENTION

Technical Problem

However, the method disclosed by the Non-Patent Literature 1 has a problem that motion blur cannot be corrected in environments where the use of a high-speed shutter is not possible. For example, capturing an image using a high-speed shutter in low illumination environments ends up obtaining a dark image due to an insufficient amount of light. The use of such a dark image lowers accuracy of pixel correlation among images. When the sensitivity is increased in order to solve the problem of insufficient amount of light in low illumination environments, noise signals such as dark-current noise and thermal noise which are attributed to imaging devices will be amplified and thereby lower the accuracy of pixel correlation among images. Thus, in the method disclosed by the Non-Patent Literature 1, the accuracy of pixel correlation among images is lowered and the motion blur cannot therefore be corrected with accuracy in the low illumination environments, in which the motion blur is often caused.

As in the case of the Non-Patent Literature 1, the method disclosed by the Patent Literature 1 requires multiple images consecutively captured and therefore is unable to correct the motion blur with accuracy in the low illumination environments. Furthermore, the Patent Literature 1 discloses calculating the degradation functions at all the pixel positions of the target image based on the degradation functions calculated based on multiple regions of the target image, but fails to disclose a specific method.

In view of the above problems, the present invention has been devised and an object thereof is to provide an image correction apparatus capable of accurately correcting an input image containing multiple kinds of blur to generate a target image with less blur than the input image.

Solution to Problem

In order to achieve the above object, an image correction apparatus according to an aspect of the present invention is an image correction apparatus which corrects an input image to generate a target image with less blur than the input image, the image correction apparatus comprising: an adaptive region division unit configured to divide the input image into a plurality of adaptive regions by determining regions having blur in common as one adaptive region based on pixel values of pixels included in the input image, and to calculate, for each of the adaptive regions, a point spread function representing characteristics of image blur; a point spread function interpolation unit configured to interpolate, using the calculated point spread function, a point spread function for a pixel located between representative pixels each representing a corresponding one of the adaptive regions; and an image correction unit configured to correct the input image using the point spread functions available after the interpolation, so as to generate the target image.

With this structure, the input image can be adaptively divided into multiple regions so that regions having blur in common form one adaptive region. As a result, the input image can be corrected using point spread functions for respective regions having blur in common and it is therefore possible to accurately correct the input image containing multiple components of blur to generate a target image with less blur than the input image. Moreover, using the point spread functions calculated for the respective regions, it is possible to interpolate the point spread function for a pixel located between the representative pixels, which can prevent the point spread functions from being discontinuous at a boundary of the regions resulting from the division and thus reduce the feeling of strangeness which discontinuous point spread functions would generate in the target image.

Furthermore, it is preferable that the adaptive region division unit be configured to determine the regions having blur in common as one adaptive region based on similarity between the point spread functions.

With this structure, the common characteristics of blur can be identified based on the similarity between the point spread functions, with the result that the regions having blur in common can be accurately determined as one adaptive region.

Furthermore, it is preferable that the adaptive region division unit include: a first point spread function calculation unit configured to calculate, as a first point spread function, a point spread function of an initial region which is a partial region of the input image; a region holding unit configured to hold the initial region as a holding region; a second point spread function calculation unit configured to calculate, as a second point spread function, a point spread function of an evaluation region which is a region that includes and is larger than the initial region; a similarity determination unit configured to determine whether or not the first point spread function and the second point spread function are similar; and an adaptive region determination unit configured to determine the regions having blur in common as one adaptive region by determining, as the adaptive region, the holding region held last by the region holding unit, when the similarity determination unit determines that the first point spread function and the second point spread function are not similar, the region holding unit is configured to hold the evaluation region as the holding region, when the similarity determination unit determines that the first point spread function and the second point spread function are similar, and the second point spread function calculation unit is configured to calculate, as the second point spread function, a point spread function of a new evaluation region that includes and is larger than the evaluation region, when the similarity determination unit determines that the first point spread function and the second point spread function are similar.

With this structure, the input image can be adaptively divided into the adaptive regions such that the regions having similar point spread functions form one region, with the result that one input image obtained by photographing multiple subjects which move in different directions can be divided into adaptive regions corresponding to the subjects. This means that the input image can be corrected using the point spread functions which match blur directions of respective subjects, resulting in a target image with less blur.

Furthermore, it is preferable that the first point spread function calculation unit include: a candidate region selection unit configured to select a whole or partial region of the input image as a candidate region; a blur direction determination unit configured to determine whether or not blur in the candidate region selected by the candidate region selection unit is unidirectional; and an initial region determination unit configured to determine the candidate region as the initial region, when the blur direction determination unit determines that the blur is unidirectional, and the candidate region selection unit is configured to select, as a new candidate region, a region which is smaller than the candidate region, when the blur direction determination unit determines that the blur is not unidirectional.

With this structure, regions having unidirectional blur can be determined as an initial region for determining an adaptive region, which can reduce the possibility that one adaptive region includes subject images having blur in different directions. This means that the input image can be corrected using the PSFs which match blur directions of respective subject images, and therefore can result in a target image with less blur.

Furthermore, it is preferable that the adaptive region division unit be configured to determine the regions having blur in common as one adaptive region based on whether or not the blur is unidirectional.

With this structure, the common characteristics of blur can be identified based on whether or not the blur is unidirectional, with the result that regions having blur in common can be accurately determined as one adaptive region.

Furthermore, it is preferable that the adaptive region division unit include: a candidate region selection unit configured to select a whole or partial region of the input image as a candidate region; a blur direction determination unit configured to determine whether or not blur in the candidate region selected by the candidate region selection unit is unidirectional; and an adaptive region determination unit configured to determine the region having blur in common as one adaptive region by determining the candidate region as the adaptive region, when the blur direction determination unit determines that the blur is unidirectional, and the candidate region selection unit is configured to select, as a new candidate region, a region which is smaller than the candidate region, when the blur direction determination unit determines that the blur is not unidirectional.

With this structure, regions having unidirectional blur can be determined as one adaptive region, with the result that the input image can be prevented from being divided in a manner that regions having images of multiple subjects which move in different directions form one adaptive region. This means that the input image can be corrected using the PSFs which correspond to blur directions of subject images, thus resulting in a target image with less blur.

Furthermore, it is preferable that, when at least two point spread functions of the calculated point spread functions are each represented by a straight line, the point spread function interpolation unit be configured to divide each of the at least two point spread functions into two or more parts, and to interpolate the point spread function for a pixel located between the representative pixels of the adaptive regions corresponding to the at least two point spread functions, based on a correspondence relationship obtained by associating the at least two point spread functions with each other using the divided point spread functions.

This structure makes it possible to easily interpolate a point spread function in the case where the point spread functions are each represented by a straight line.

Furthermore, it is preferable that the point spread function interpolation unit be configured to determine whether or not the calculated point spread functions are similar to each other, and to interpolate a point spread function for a pixel located between the representative pixels of the adaptive regions each corresponding to one of the point spread functions determined as being similar to each other.

This structure makes it possible to interpolate a point spread function even in the case where the point spread functions are each not represented by a straight line.

Furthermore, it is preferable that the point spread function interpolation unit be configured to interpolate the point spread function for a pixel located between the representative pixels of the adaptive regions each corresponding to one of the calculated point spread functions, based on a correspondence relationship obtained by associating the calculated point spread functions with each other by a matching method using dynamic programming.

With this structure, no point spread function is interpolated in adaptive regions whose point spread functions are not similar to each other, which can reduce the possibility that a point spread function is interpolated at a boundary of images of subjects which make different movements. That is, it becomes possible to reduce the possibility of interpolating a point spread function which corresponds to movement different from actual movement of the subject.

It is to be noted that the present invention can be implemented not only as the image correction apparatus described above but also as an integrated circuit including characteristic components of the image correction apparatus described above.

In addition, the present invention can be implemented not only as the image correction apparatus described above but also as an image correction method including, as steps, operations of characteristic components of the image correction apparatus described above. Furthermore, the present invention can be implemented as a program which causes a computer to execute the steps included in the image correction apparatus. In addition, it goes without saying that such program may be distributed via a recording medium such as Compact Disc-Read Only Memory (CD-ROM) and a communication network as the Internet.

Advantageous Effects of Invention

As is clear from the above description, the image correction apparatus according to the present invention is capable of dividing an input image containing multiple kinds of blur into multiple adaptive regions so that regions having blur in common form one adaptive region. Thus, the image correction apparatus is capable of correcting the input image for each set of regions having blur in common, which enables accurate correction on the input image containing multiple kinds of blur to obtain a target image with less blur than the input image.

DESCRIPTION OF EMBODIMENTS

First Embodiment

Figure 1:
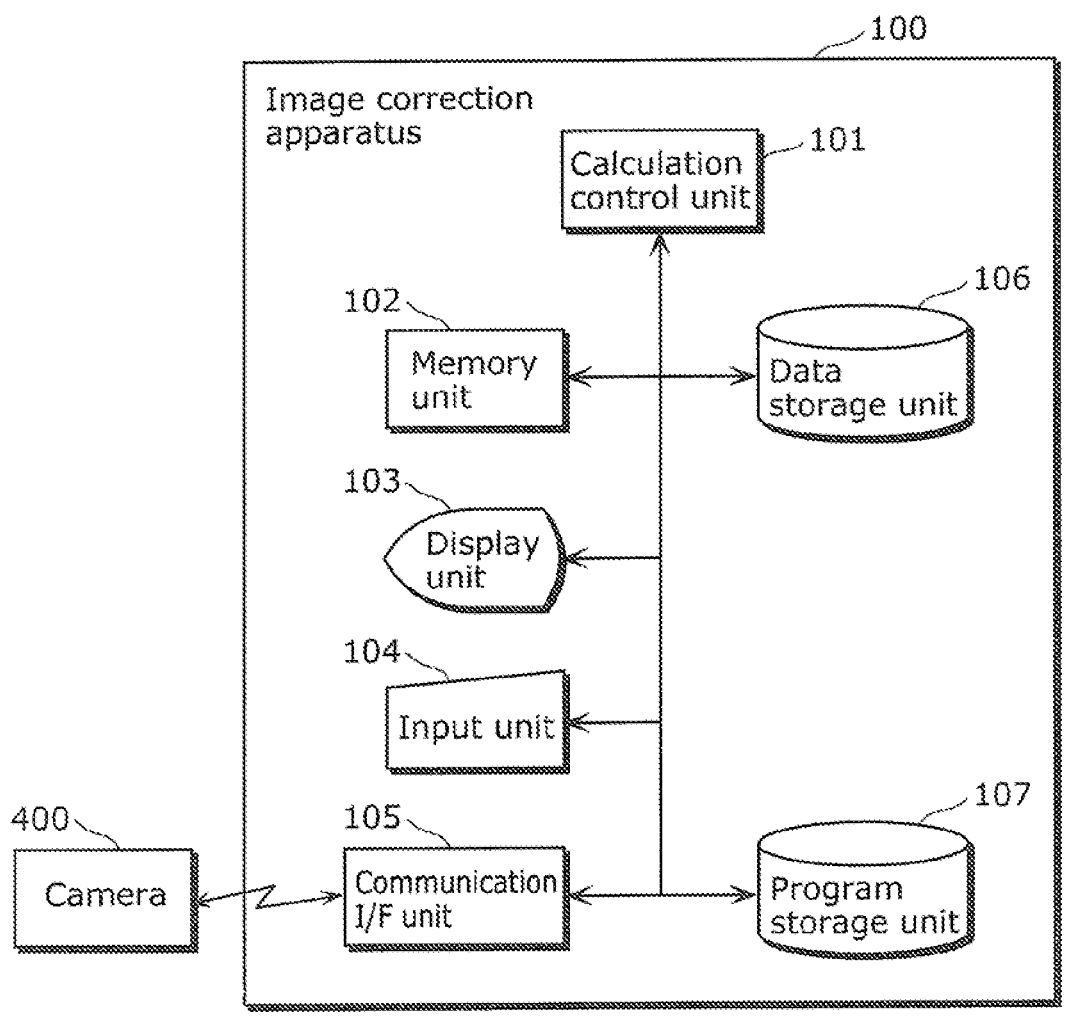
FIG. 1 is a block diagram showing a function structure of an image correction apparatus according to the first and second embodiments of the present invention.

FIG. 1 is a block diagram showing a function structure of an image correction apparatus 100 according to the first embodiment of the present invention.

As shown in FIG. 1, the image correction apparatus 100 includes a calculation control unit 101, a memory unit 102, a display unit 103, an input unit 104, a communication I/F (interface) unit 105, a data storage unit 106, and a program storage unit 107. These components 101 to 107 are connected via a bus 108.

The calculation control unit 101 is a central processing unit (CPU), a numerical processor, or the like. The calculation control unit 101 loads a program necessary for the memory unit 102 from the program storage unit 107 according to an instruction or the like from a user and executes the program, and according to the execution result, the calculation control unit 101 controls the components 102 to 107.

The memory unit 102 is a random access memory (RAM) or the like which provides a work area for the calculation control unit 101.

The display unit 103 is a cathode-ray tube (CRT), a liquid crystal display (LCD), or the like. The input unit 104 is a keyboard, a mouse, or the like. These display unit 103 and input unit 104 are used, for example, for the image correction apparatus 100 and a user to interact with each other under control of the calculation control unit 101.

The communication I/F unit 105 is a LAN adaptor or the like, and used for communication between the image correction apparatus 100 and a camera 400 or the like.

The data storage unit 106 is a hard disk, a flash memory, or the like, in which an input image obtained by the camera 400, a target image obtained by correcting the input image, and so on are stored.

The program storage unit 107 is a read only memory (ROM) or the like in which various programs for activating a function of the image correction apparatus 100 is stored.

Figure 2:
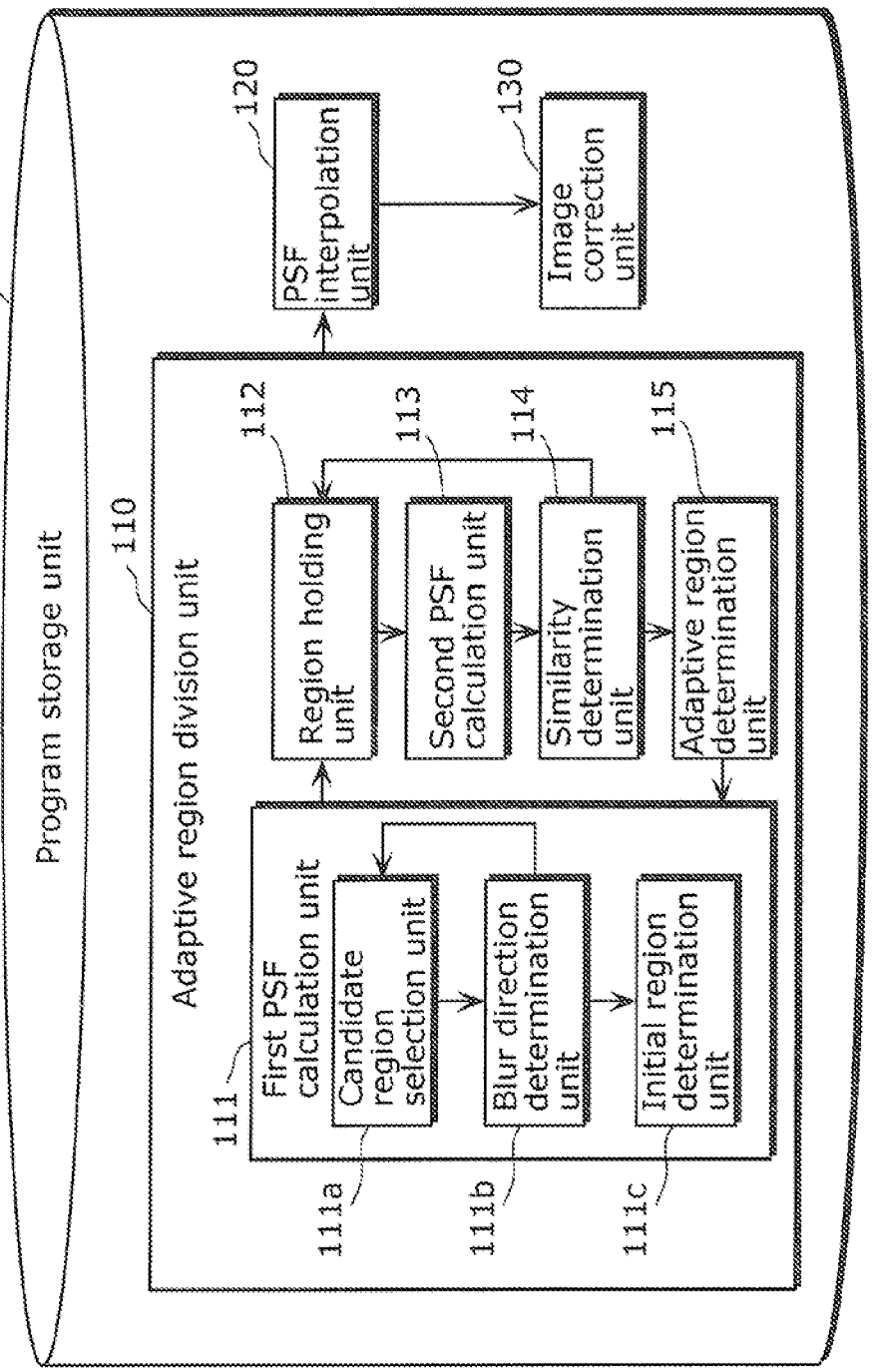
FIG. 2 is a block diagram showing a function structure of a program storage unit according to the first embodiment of the present invention.

FIG. 2 is a block diagram showing a function structure of the program storage unit 107 according to the first embodiment of the present invention. As shown in FIG. 2, the program storage unit 107 includes an adaptive region division unit 110, a PSF interpolation unit 120, and an image correction unit 130 functionally (as a processing unit which functions when executed by the calculation control unit 101).

On the basis of pixel values of pixels included in the input image, the adaptive region division unit 110 determines regions having blur in common as one adaptive region, and thus divides the input image into multiple adaptive regions. Furthermore, the adaptive region division unit 110 calculates a PSF of each adaptive region resulting from the division. Specifically, the adaptive region division unit 110 refers to the similarity between PSFs to determine regions having blur in common as one adaptive region.

As shown in FIG. 2, the adaptive region division unit 110 includes a first PSF calculation unit 111, a region holding unit 112, a second PSF calculation unit 113, a similarity determination unit 114, and an adaptive region determination unit 115.

The first PSF calculation unit 111 calculates, as the first PSF, a PSF of an initial region which is a partial region of the input image. Specifically, the first PSF calculation unit 111 includes a candidate region selection unit 111*a*, a blur direction determination unit 111*b*, and an initial region determination unit 111*c*. The first PSF calculation unit 111 calculates, as the first PSF, the PSF of the initial region determined by the initial region determination unit 111*c*.

The candidate region selection unit 111*a* selects a whole or partial region of the input image as a candidate region. In the case where the blur direction determination unit 111*b* determines that the blur is not unidirectional, the candidate region selection unit 111*a* selects, as a new candidate region, a region smaller than the candidate region.

The blur direction determination unit 111*b* determines whether or not blur in the candidate region selected by the candidate region selection unit 111*a* is unidirectional.

In the case where the blur direction determination unit 111*b* determines that the blur is unidirectional, the initial region determination unit 111*c* determines the candidate region as the initial region.

The region holding unit 112 holds the initial region as a held region. In the case where the later-described similarity determination unit 114 determines that the first PSF and the second PSF are similar, the region holding unit 112 furthermore holds an evaluation region as a holding region.

The second PSF calculation unit 113 calculates, as the second PSF, a PSF of an evaluation region which includes and is larger than the initial region. In the case where the similarity determination unit 114 determines that the first PSF and the second PSF are similar, the second PSF calculation unit 113 calculates, as the second PSF, a PSF of a new evaluation region which includes and is larger than the evaluation region.

The similarity determination unit 114 determines whether or not the first PSF and the second PSF are similar.

In the case where the similarity determination unit 114 determines that the first PSF and the second PSF are not similar, the adaptive region determination unit 115 determines, as an adaptive region, a held region which is held last by the region holding unit 112. In sum, the adaptive region division unit 115 refers to the similarity between PSFs to determine regions having blur in common as one adaptive region.

Using the calculated PSF, the PSF interpolation unit 120 interpolates PSFs for pixels located between representative pixels. The representative pixels herein indicate pixels each representing one of the regions. For example, the representative pixel is a pixel at the center, at the center of gravity, or the like, of each region.

Specifically, the PSF interpolation unit 120 associates the PSFs calculated for respective adaptive regions, by a matching method using dynamic programming (which method is hereinafter referred to as "DP matching"), for example. On the basis of the correspondence relationship resulting from the above association of PSFs, the PSF interpolation unit 120 interpolates a PSF for a pixel located between the representative pixels each included in one of the adaptive regions which correspond to the respective PSFs.

In the case, for example, where at least two PSFs of the calculated PSFs are represented by straight lines, the PSF interpolation unit 120 may associate PSFs with the at least two PSFs separated. Specifically, on the basis of the correspondence relationship resulting from such association of PSFs, the PSF interpolation unit 120 may interpolates PSFs for the pixels located between the representative pixels each included in one of the adaptive regions which corresponds to each of the at least two PSFs.

In addition, the PSF interpolation unit 120 determines whether or not the PSFs are similar to each other, and interpolates PSFs for pixels located between the representative pixels of the adaptive regions which correspond to the respective PSFs determined to be similar to each other.

The image correction unit 130 corrects the input image using the PSFs, thereby generating a target image with less blur than the input image.

Next, various operations in the image correction apparatus 100 configured as above are described.

Figure 3:
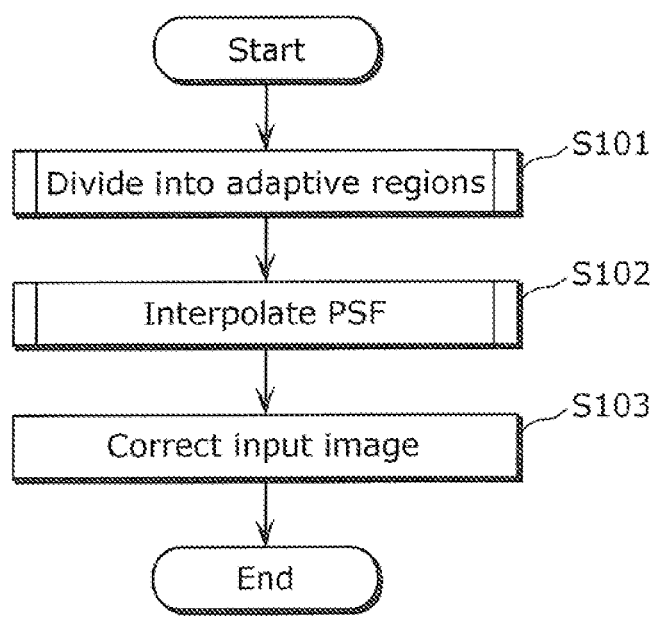
FIG. 3 is a flowchart showing an overall process flow of the image correction apparatus according to the first and second embodiments of the present invention.

FIG. 3 is a flowchart showing an overall process flow of the image correction apparatus 100 according to the first embodiment of the present invention.

First, according to pixel values of pixels included in an input image stored in the data storage unit 106, the adaptive region division unit 110 divides the input image into multiple adaptive regions each having an adaptive size. Furthermore, the adaptive region division unit 110 calculates a PSF of each adaptive region (S101). Using the PSF calculated for each adaptive region, the PSF interpolation unit 120 then interpolates PSFs for pixels located between the representative pixels of the respective adaptive regions (S102).

Lastly, the image correction unit 130 corrects the input image using the PSFs for respective pixels which are present after the interpolation, to generate a target image with less blur than the input image (S103). For example, the image correcting unit 130 corrects the input image using the Richardson-Lucy method indicated by the following expression (1) and using the PSFs for pixels obtained based on the processing in Step S101 and Step 102.

[Math. 1]

$$I_{n+1} = \left(K * \frac{B+1}{(I_n+1) \otimes K}\right)(I_n+1) \quad (1)$$

$\otimes$: Convolution

In this expression, I represents the corrected image (target image), K represents the PSF, and B represents the input image.

While the image correction unit 130 corrects the input image using the Richardson-Lucy method in the present embodiment, the input image may be corrected using other methods such as the Fourier-log method or the Maximum Entropy.

Next, the details of region division by the adaptive region division unit 100 are described.

Figure 4:
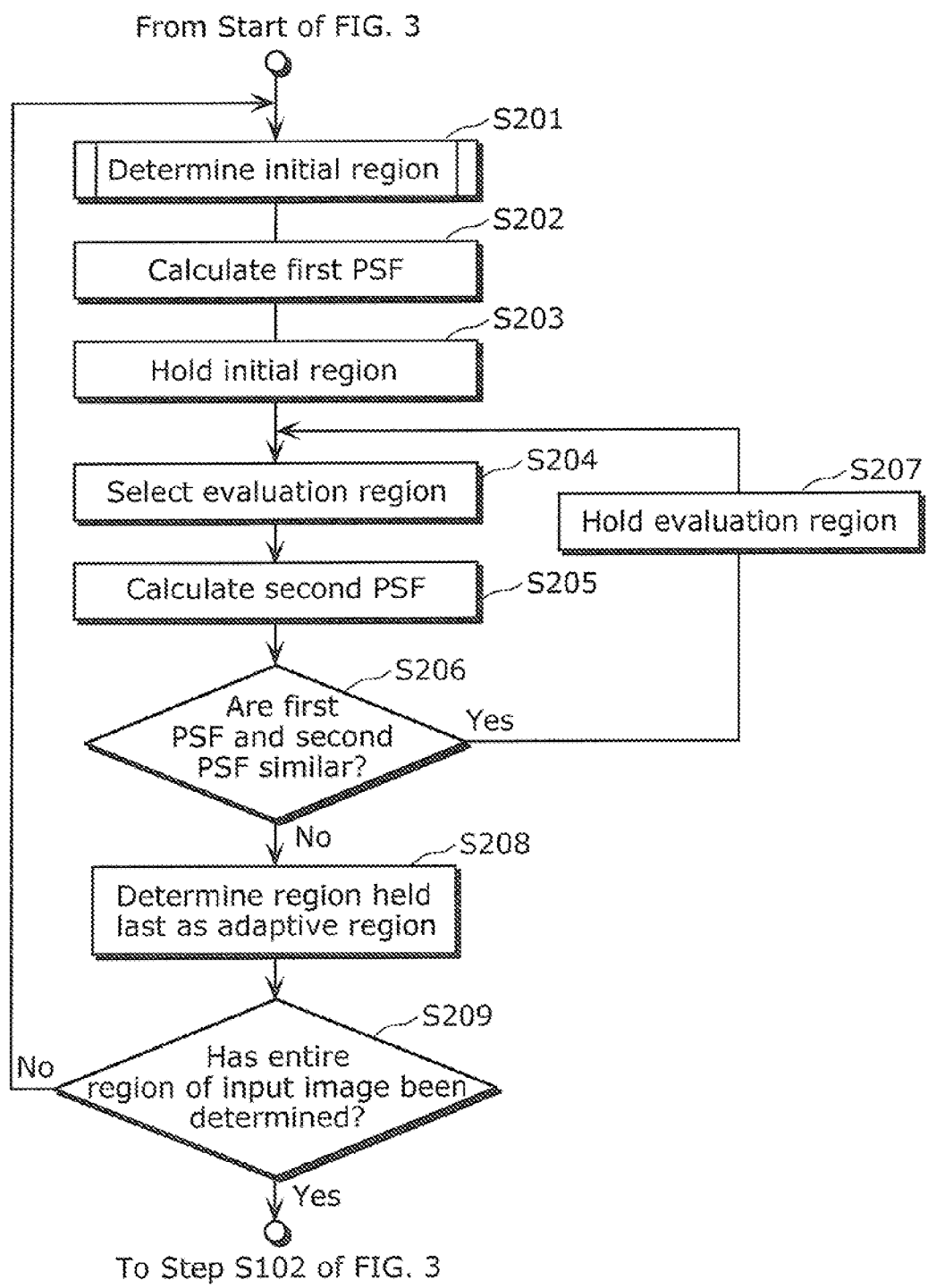
FIG. 4 is a flowchart showing a process flow of an adaptive region division unit according to the first embodiment of the present invention.

FIG. 4 is a flowchart showing a process flow (S101) of the adaptive region division unit 110 according to the first embodiment of the present invention.

First, the first PSF calculation unit 111 determines an initial region which is a partial region of the input image (S201). The details of processing for determining the initial region are described later.

Subsequently, the first PSF calculation unit 111 calculates a PSF of the determined initial region as the first PSF (S202). Specifically, the first PSF calculation unit 111 calculates the PSF using a method of calculating a PSF from a single image (for example, refer to Non-patent literature 2 "Removing camera shake from a single photograph (Rob Fergus et. Al, SIGGRAPH2006)").

In the case of using the method disclosed by Non-patent literature 2, image gradient distribution which appears in a general natural image without blur is stored in the data storage unit 106. The first PSF calculation unit 111 then repeats the comparison between the image gradient distribution obtained by correcting the initial region using a given PSF and the image gradient distribution stored in the data storage unit 106, to search for a PSF with which the image gradient distribution match or become similar to each other. The first PSF calculation unit 111 then determines, as the first PSF, the PSF obtained as a result of this search.

Next, the region holding unit 112 holds, as a holding region, the initial region determined by the first PSF calculation unit 111 (S203).

Subsequently, the second PSF calculation unit 113 selects an evaluation region (S204). This evaluation region is a region which includes and is larger than the initial region. For example, in the case where the initial region is a rectangular region, the second PSF calculation unit 113 selects an evaluation region which is one pixel larger in the x direction and one pixel larger in the y direction than the initial region. The second PSF calculation unit 113 then calculates, as the second PSF, a PSF of the selected evaluation region (S205).

It is to be noted that the second PSF calculation unit 113 does not need to determine, as the evaluation region, a region which is larger in both of the x direction and the y direction than the initial region. For example, the second PSF calculation unit 113 may determine, as the evaluation region, a region which is larger in only one of the x direction and the y direction than the initial region. Furthermore, the second PSF calculation unit 113 may determine, as the evaluation region, a region which is obtained, for example, by moving a part of the edge of the initial region outwardly in the x direction or the y direction. By so doing, the second PSF calculation unit 113 is capable of selecting the evaluation region flexibly, which allows improvement of possibility of selecting, as one region, images of subjects that make the same movement.

Next, the similarity determination unit 114 determines whether or not the first PSF and the second PSF are similar (S206). Specifically, the similarity determination unit 114 calculates, as a similarity indicating a degree of similarity between PSFs, a distance between images which are obtained by representing the first PSF and the second PSF as images. For example, the similarity determination unit 114 calculates, as the similarity, L1 norm calculated by the following expression (2). A smaller value of L1 norm indicates a higher degree of the similarity.

[Math. 2]

$$L1norm = \sum_{i,j} |P1ij - P2ij| \quad (2)$$

Herein, $P1_{ij}$ represents a PSF value of a pixel specified by coordinates (i, j) in the case where the first PSF is represented as an image. Likewise, $P2_{ij}$ represents a PSF value of a pixel specified by coordinates (i, j) in the case where the second PSF is represented as an image.

When L1 norm of the first PSF and the second PSF is smaller than a predetermined threshold, the similarity determination unit 114 determines that the first PSF and the second PSF are similar to each other. Conversely, when L1 norm of the first PSF and the second PSF is equal to or more than the predetermined threshold, the similarity determination unit 114 determines that the first PSF and the second PSF are not similar to each other.

While the similarity determination unit 114 calculates L1 norm as the similarity in the present embodiment, other methods of determining similarity between images may be used to calculate the similarity. For example, the similarity determination unit 114 may calculate L2 norm as the similarity.

When it is determined that the first PSF and the second PSF are similar (Yes in S206), the region holding unit 112 holds the evaluation region as the held region (S207). Furthermore, the second PSF calculation unit 113 selects a new evaluation region (S204). This new evaluation region is a region which includes and is larger than the held region held in Step S207. Subsequently, using the new evaluation region, the processing in Step S205 and Step S206 is executed. Thus, the processing from Step S204 to S207 is repeated until it is determined in Step S206 that the first PSF and the second PSF are not similar.

On the other hand, when it is determined that the first PSF and the second PSF are not similar (No in S206), the adaptive region determination unit 115 determines, as the adaptive region, the held region held last in Step S207 (S208).

Subsequently, the first PSF calculation unit 111 determines whether or not all the pixels of the input image are included in the already determined adaptive region (S209).

When not all the pixels of the input image are included in the already determined adaptive region (No in S209), the first PSF calculation unit 111 determines, as the initial region, a region which includes only the pixels not yet included in the adaptive region (S201). For example, the first PSF calculation unit 111 determines the initial region so that the initial region includes pixels adjacent to the right end or lower end of the determined adaptive region. The first PSF calculation unit 111 may determine the initial region so that the initial region includes not adjacent pixels but pixels which are away by the number of pixels determined according to prospective knowledge. Alternatively, the first PSF calculation unit 111 may determine the initial region so that the initial region includes pixels which are away by the number of pixels indicated by an input value which a user enters on the input unit 104.

On the other hand, when all the pixels of the input image are included in the already determined adaptive region (Yes in S209), the processing in Step S102 of FIG. 3 is executed.

The adaptive region division unit 110 divides the input image into multiple adaptive regions by repeating the above processing from Step S201 to Step S209.

By thus dividing the input image in a manner that the regions having similar PSFs form one region, it is possible to match a boundary between images of subjects that make different movements with a boundary between the regions.

Next, the process flow of the above region division by the adaptive region division unit 110 is specifically described with reference to FIG. 5.

Figure 5:
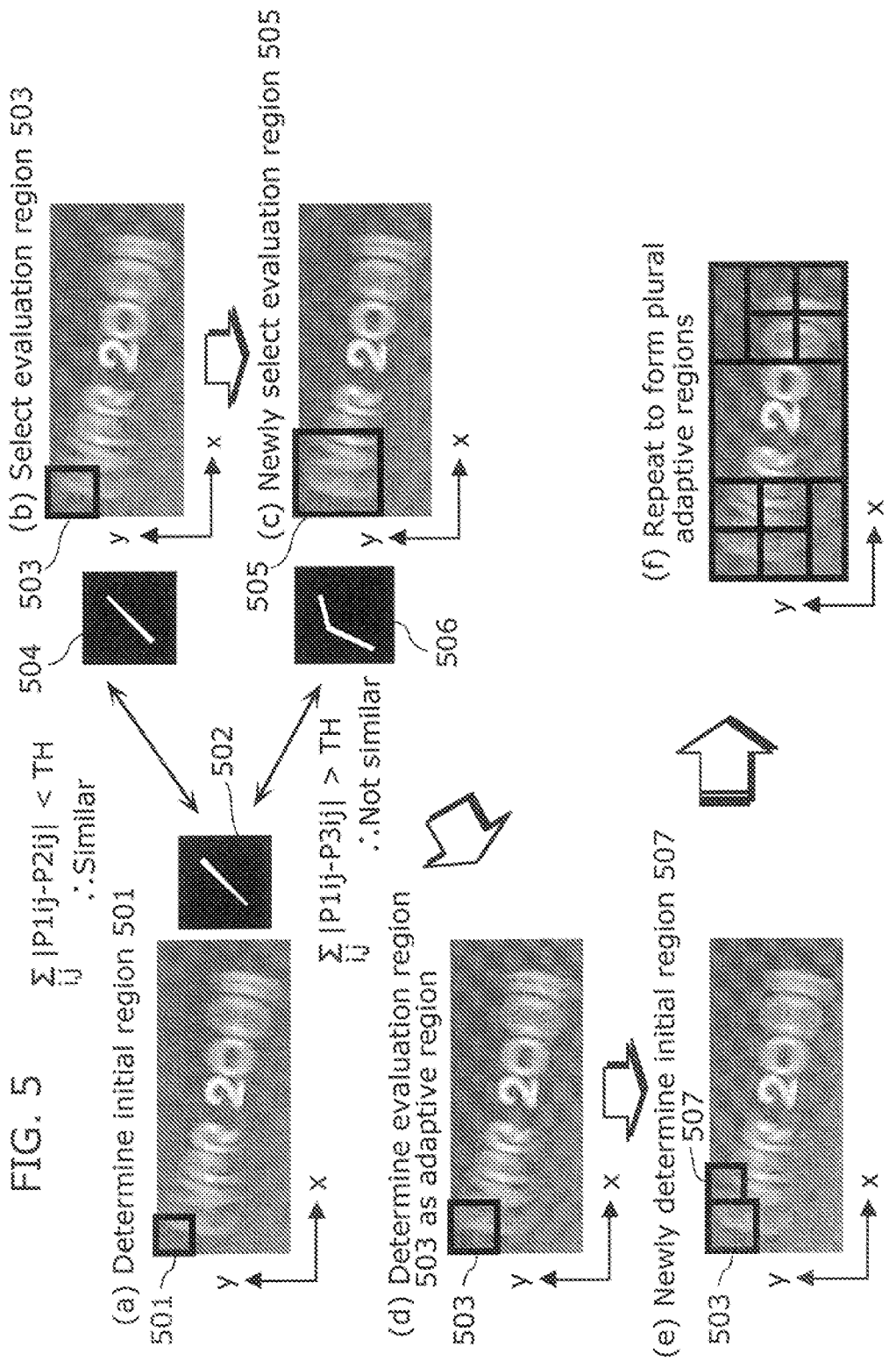
FIG. 5 illustrates a process flow of region division by the adaptive region division unit according to the first embodiment of the present invention.

FIG. 5 illustrates the process flow of the region division by the adaptive region division unit 110 according to the first embodiment of the present invention.

First, as shown in FIG. 5(a), the first PSF calculation unit 111 determines an initial region 501. The first PSF calculation unit 111 then calculates the first PSF 502 (P1) which is the PSF of the initial region 501. While the initial region 501 is rectangular herein, the initial region 501 does not necessarily have to be rectangular. For example, the initial region 501 may have a given shape such as a rhomboid, a parallelogram, or a circle.

Next, as shown in FIG. 5(b), the second PSF calculation unit 113 selects, as an evaluation region 503, a region which includes and is larger than the initial region 501. The second PSF calculation unit 113 then calculates, as the second PSF 504 (P2), a PSF of the evaluation region 503. While the evaluation region 503 is rectangular herein, the evaluation region 503 does not necessarily have to be rectangular. For example, the evaluation region 503 may have a given shape such as a rhomboid, a parallelogram, or a circle.

The similarity determination unit 114 then calculates L1 norm of the first PSF 502 and the second PSF 504. Because the calculated norm is smaller than a threshold TH, the similarity determination unit 114 determines that the first PSF 502 and the second PSF 504 are similar to each other. Accordingly, the region holding unit 112 holds the evaluation region 503.

Next, as shown in FIG. 5(c), the second PSF calculation unit 113 selects, as an evaluation region 505, a region which includes and is larger than the evaluation region 503. The second PSF calculation unit 113 then calculates, as the second PSF 506 (P3), a PSF of the evaluation region 505.

The similarity determination unit 114 then calculates L1 norm of the first PSF 502 and the second PSF 506. Because the calculated norm is equal to or larger than the threshold TH, the similarity determination unit 114 determines that the first PSF 502 and the second PSF 504 are not similar to each other. Accordingly, the adaptive region determination unit 115 determines, as the adaptive region, the evaluation region 503 held last by the region holding unit 112.

Next, as shown in FIG. 5(e), the first PSF calculation unit 111 determines, as an initial region 507, a region adjacent to the determined adaptive region.

By repeating such processing from the determination of the initial region to the determination of the adaptive region, the adaptive region division unit 110 divides the input image into multiple adaptive regions as shown in FIG. 5(f).

Next, the details of PSF interpolation process in the PSF interpolation unit 120 are described. When there is a difference in PSF between the regions resulting from the division, a blur boundary will appear in a target image after correction, which provokes a feeling of strangeness. The PSF interpolation unit 120 therefore interpolates a PSF as follows in order to reduce the feeling of strangeness in the target image after correction.

Figure 6:
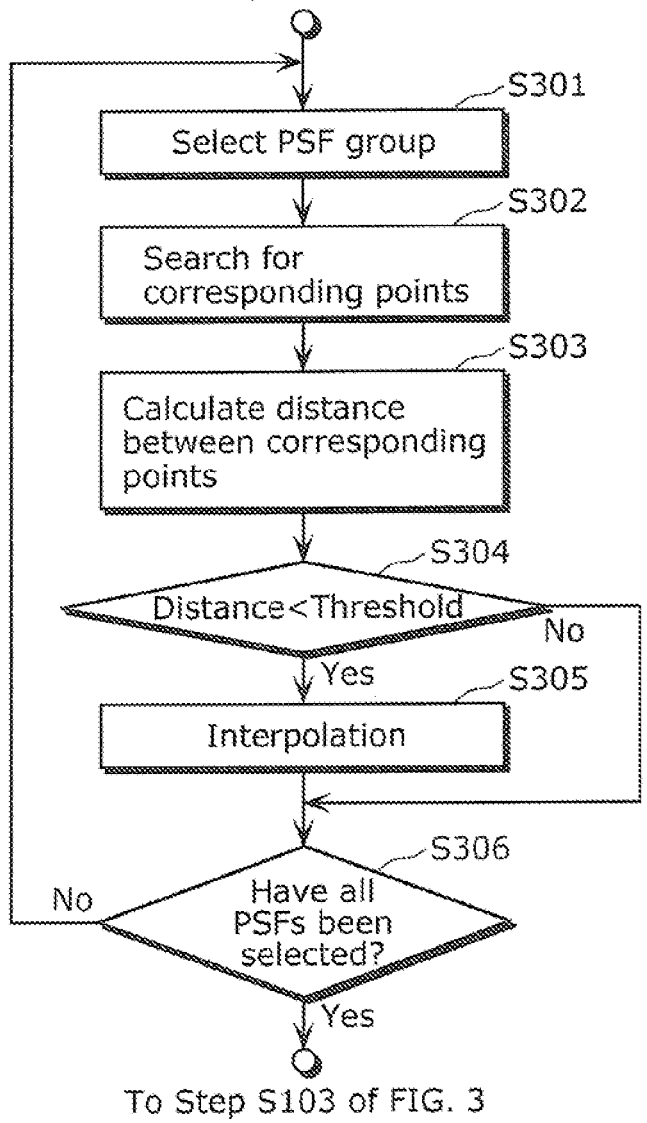
FIG. 6 is a flowchart showing a process flow of a PSF interpolation unit according to the first and second embodiments of the present invention.

FIG. 6 is a flowchart showing a process flow (S102) of the PSF interpolation unit 120 according to the first embodiment of the present invention.

First, the PSF interpolation unit 120 selects a PSF group which includes at least two PSFs among multiple PSFs calculated for respective adaptive regions obtained by the adaptive region division unit 110 (S301). For example, the PSF interpolation unit 120 selects the PSFs of two adjacent adaptive regions.

Figure 7:
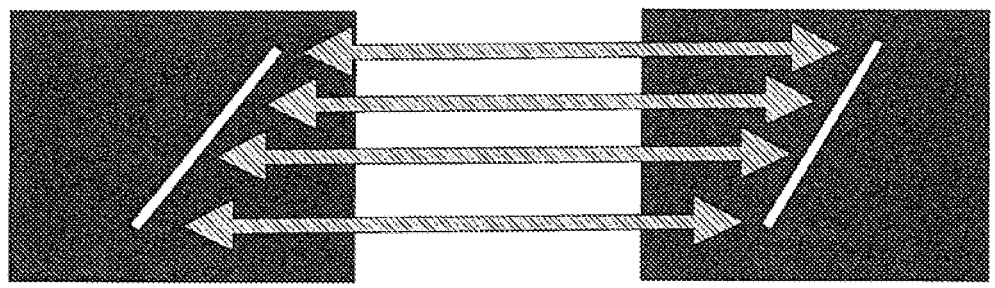
FIG. 7 illustrates interpolation of a PSF by the PSF interpolation unit according to the first and second embodiments of the present invention.
Figure 8:
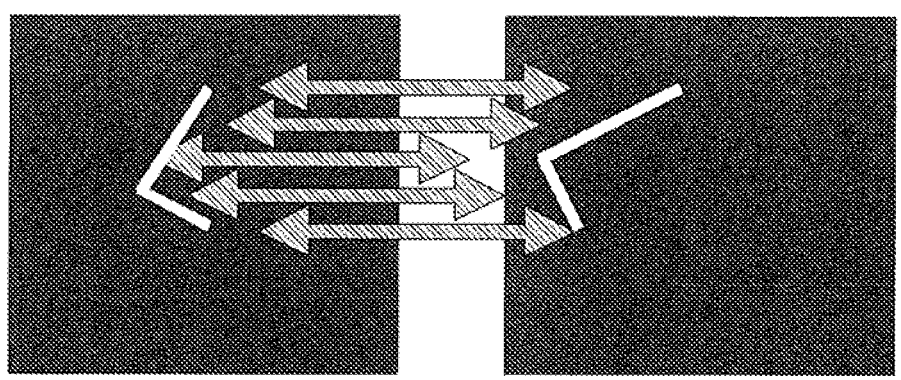
FIG. 8 illustrates interpolation of a PSF by the PSF interpolation unit according to the first and second embodiments of the present invention.

Subsequently, the PSF interpolation unit 120 searches for corresponding points which are points that correspond to each other in the PSFs included in the selected PSF group (S302). For example, when the two PSFs are each represented by one straight line as shown in FIG. 7, the PSF interpolation unit 120 equally divides each of the two PSFs into N parts (N is a positive integer). The PSF interpolation unit 120 then searches the two PSFs for the corresponding points by associating the N equally-divided parts in one of the two PSFs with those in the other. Furthermore, for example, when at least one of the two PSFs is not represented by one straight line as shown in FIG. 8, the corresponding points may be searched for by the DP matching. A combination of the corresponding points searched out herein is referred to as correspondence relationship.

Next, the PSF interpolation unit 120 calculates a distance between the searched-out corresponding points (S303). Specifically, as in Step S206 of FIG. 5, the PSF interpolation unit 120 calculates, for example, norm or the like, as the distance. When L1 norm is calculated as the distance, a smaller value of L1 norm indicates a higher degree of the similarity.

Next, the PSF interpolation unit 120 determines whether or not the calculated distance is smaller than a predetermined threshold (S304). That is, the PSF interpolation unit 120 determines whether the PSFs included in the PSF group are similar to each other.

When it is determined that the distance is larger than the predetermined threshold (No in S304), the PSF interpolation unit 120 executes the processing in Step S306. That is, when it is determined that the PSFs are not similar to each other, the PSF interpolation unit 120 does not interpolate PSFs in the adaptive regions corresponding to the PSFs. This means that the respective pixels within an adaptive region have uniform PSFs which are each the PSF calculated for the adaptive region.

The reason why the PSF interpolation unit 120 does not interpolate PSFs when it is determined that the PSFs are not similar to each other is that it is highly possible that subject images included in the adaptive regions corresponding to the PSFs which are not similar to each other are images of subjects which are making different movements. In other words, if PSFs are interpolated in multiple adaptive regions including images of different subjects, it could happen that PSFs corresponding to impossible subject movements are interpolated.

On the other hand, it is determined that the distance is smaller than the predetermined threshold (Yes in S302), the PSF interpolation unit 120 interpolates PSFs in the adaptive regions corresponding to the PSFs (S305). That is, when it is determined that the PSFs are similar to each other, the PSF interpolation unit 120 interpolates PSFs for pixels located between representative pixels of the adaptive region. In other words, on the basis of the distance from the representative pixel and the correspondence relationship of the PSFs, the PSF interpolation unit 120 interpolates PSFs for pixels which are positioned inside and outside each of the adaptive regions and are other than the representative pixels. Specifically, according to the distance between the position of a pixel to be interpolated and each of the representative pixels, the PSF interpolation unit 120 calculates a new PSF which is based on the correspondence relationship of the PSFs, and interpolates the calculated PSF as a PSF for the pixel.

In sum, only when it is determined that the PSFs are similar to each other, the PSF interpolation unit 120 interpolates PSFs in the adaptive regions corresponding to the PSFs. This is because, when the PSFs are similar, it is highly possible that the subject images included in the adaptive regions corresponding to the PSFs are images of one subject which is making a single movement. When the PSF interpolation unit 120 interpolates PSFs in the multiple adaptive regions which include images of one subject as above, it is possible to reduce a feeling of strangeness provoked at a boundary of the adaptive regions of the target image. In interpolating PSFs, the PSF interpolation unit 120 may use any interpolation method such as linear interpolation, polynomial interpolation, or spline interpolation.

Subsequently, the PSF interpolation unit 120 determines whether or not all the PSFs have already been selected (S306). When any one of the PSFs has not been selected (No in S306), the PSF interpolation unit 120 selects a PSF group including the PSF that has not yet been selected (S301). On the other hand, when all the PSFs have been selected (Yes in S306), the processing in Step S103 of FIG. 3 is executed.

As above, using the PSF calculated for each of the adaptive regions, the PSF interpolation unit 120 interpolates PSFs for pixels located between the pixels representing the respective adaptive regions. As a result, the PSF interpolation unit 120 is capable of preventing an unnaturally large change in PSF at a boundary of adjacent adaptive regions. This means that the image correction unit 130 is capable of generating a target image which provokes no feeling of strangeness at a boundary of the adaptive regions.

Next, how the first PSF calculation unit 111 determines the initial region is described. When the initial region is too small, it is difficult for the first PSF calculation unit 111 to distinguish blur from texture and therefore difficult to calculate the PSF. On the other hand, when the initial region is too large, there is a high possibility that images of subjects which are making different movements are included in the initial region, with the result that for the first PSF calculation unit 111, it is difficult to calculate a PSF which is in accordance with the subject movement. The following therefore describes a method of determining an initial region by reducing it in size sequentially from a large region so as not to include images of multiple subjects which are making different movements.

Figure 9:
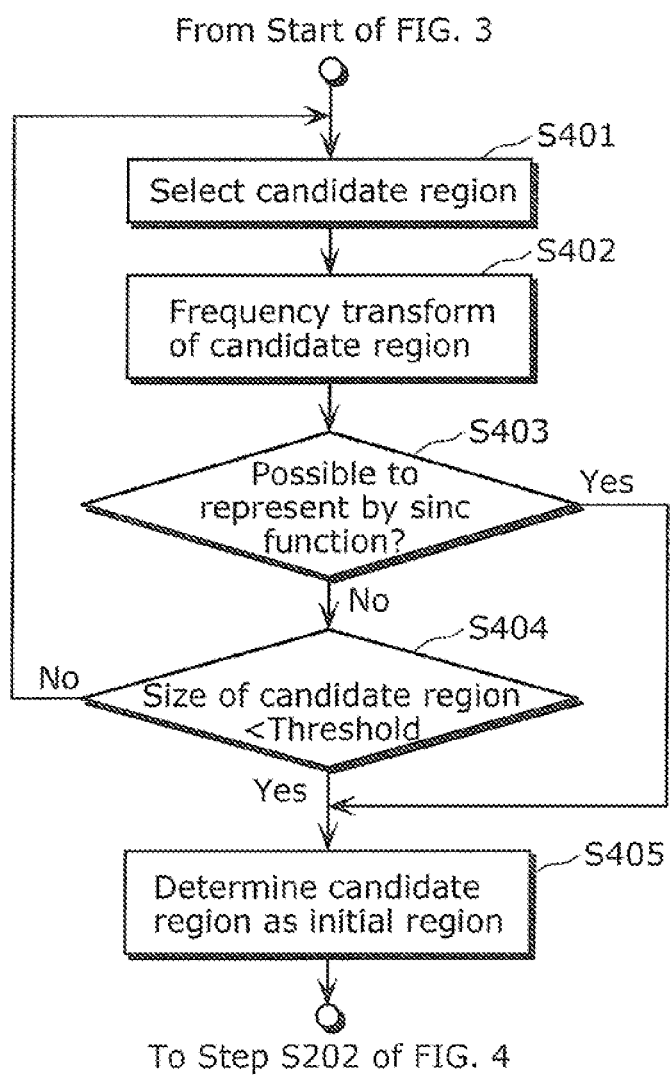
FIG. 9 is a flowchart showing a process flow for determination on an initial region by the first PSF calculation unit according to the first embodiment of the present invention.

FIG. 9 is a flowchart showing a process flow (S201) for determination on an initial region by the first PSF calculation unit 111 according to the first embodiment of the present invention.

First, the candidate region selection unit 111a selects a whole or partial region of the input image as a candidate region (S401). Subsequently, the blur direction determination unit 111b transforms pixel values of the selected candidate region into frequency domain (S402) by the discrete Fourier transform or the like.

The blur direction determination unit 111b then determines whether or not a frequency distribution which is obtained by the transformation into frequency domain can be represented by the sinc function (S403). The pixel values which are represented by square waves in the image domain can be represented by the sinc function (Expression (3)) in the frequency domain.

[Math. 3]

$$\mathrm{sinc}(x) = \frac{\sin(x)}{x} \qquad (3)$$

Accordingly, in the case where blur in an image is unidirectional, the frequency distribution which is obtained by, transforming pixel values into frequency domain is represented by the sinc function. On the other hand, in the case where blur in an image is not unidirectional, the frequency distribution which is obtained by transforming pixel values into frequency domain is not represented by the sinc function but represented as a frequency distribution in which multiple frequency components are gathered together. The blur direction determination unit 111b therefore determines whether or not the frequency distribution which is obtained by the transformation into frequency domain can be represented by the sinc function, to determine whether or not blur in the candidate region is unidirectional.

Specifically, the blur direction determination unit 111b calculates correlation values of multiple sinc functions and the frequency distribution obtained by the transformation into frequency domain. The multiple sinc functions herein indicate sinc functions which correspond to respective combinations of multiple amplitudes and multiple phases. To calculate the correlation values, the blur direction determination unit 111b uses L1 norm, L2 norm, or a method of calculating a similarity between images such as the normalized correlation.

The blur direction determination unit 111b then determines whether or not there is a sinc function in which the correlation values exceed a predetermined threshold. When there is a sinc function in which the correlation values exceed the predetermined threshold, the blur direction determination unit 111b determines that the frequency distribution can be represented by the sinc function. On the other hand, when there is no sinc function in which the correlation values exceed the predetermined threshold, the blur direction determination unit 111b determines that the frequency distribution cannot be represented by the sinc function.

When it is determined that the frequency distribution can be represented by the sinc function (Yes in S403), the initial region determination unit 111c determines the candidate region as the initial region (S405) because the blur in the initial region is unidirectional.

On the other hand, when it is determined that the frequency distribution cannot be represented by the sinc function (No in S403), the initial region determination unit 111c does not determine the candidate region as the initial region because the blur in the initial region is not unidirectional. In this case, the blur direction determination unit 111b determines whether or not the size of the candidate region is smaller than a predetermined threshold (S404). The predetermined threshold herein is a value indicating a size of a region from which PSF enabling correction on blur in an input image can be calculated accurately. This size of the region depends on an exposure time in capturing the image. For example, when the exposure time is around one second, the threshold is a value around 100 pixels (10×10 pixels).

When it is determined that the size of the candidate region is equal to or larger than the predetermined threshold (No in S404), the candidate region selection unit 111a selects, as a new candidate, a region which is smaller than the current candidate region (S401).

On the other hand, when it is determined that the size of the candidate region is smaller than the predetermined threshold (Yes in S404), the initial region determination unit 111c determines the currently selected candidate region as the initial region (S405). This is because, when the candidate region is small, the subject image included in the candidate region is considered to be an image of a single subject. In other words, because the subject image included in the candidate region is considered to be an image of a single subject which moved in multiple directions, the initial region determination unit 111c does not downsize the candidate region but determines the currently selected candidate region as the initial region.

As above, the first PSF calculation unit 111 determines the initial region by reducing a size of the candidate region until it is determined that the frequency distribution can be represented by sinc function or until the candidate region has the predetermined size. The first PSF calculation unit 111 is therefore capable of determining, as the initial region, a small region which does not include the PSFs of different blur directions.

Next, a process flow for the above determination on the initial region by the first PSF calculation unit 111 is specifically described with reference to FIG. 10.

Figure 10:
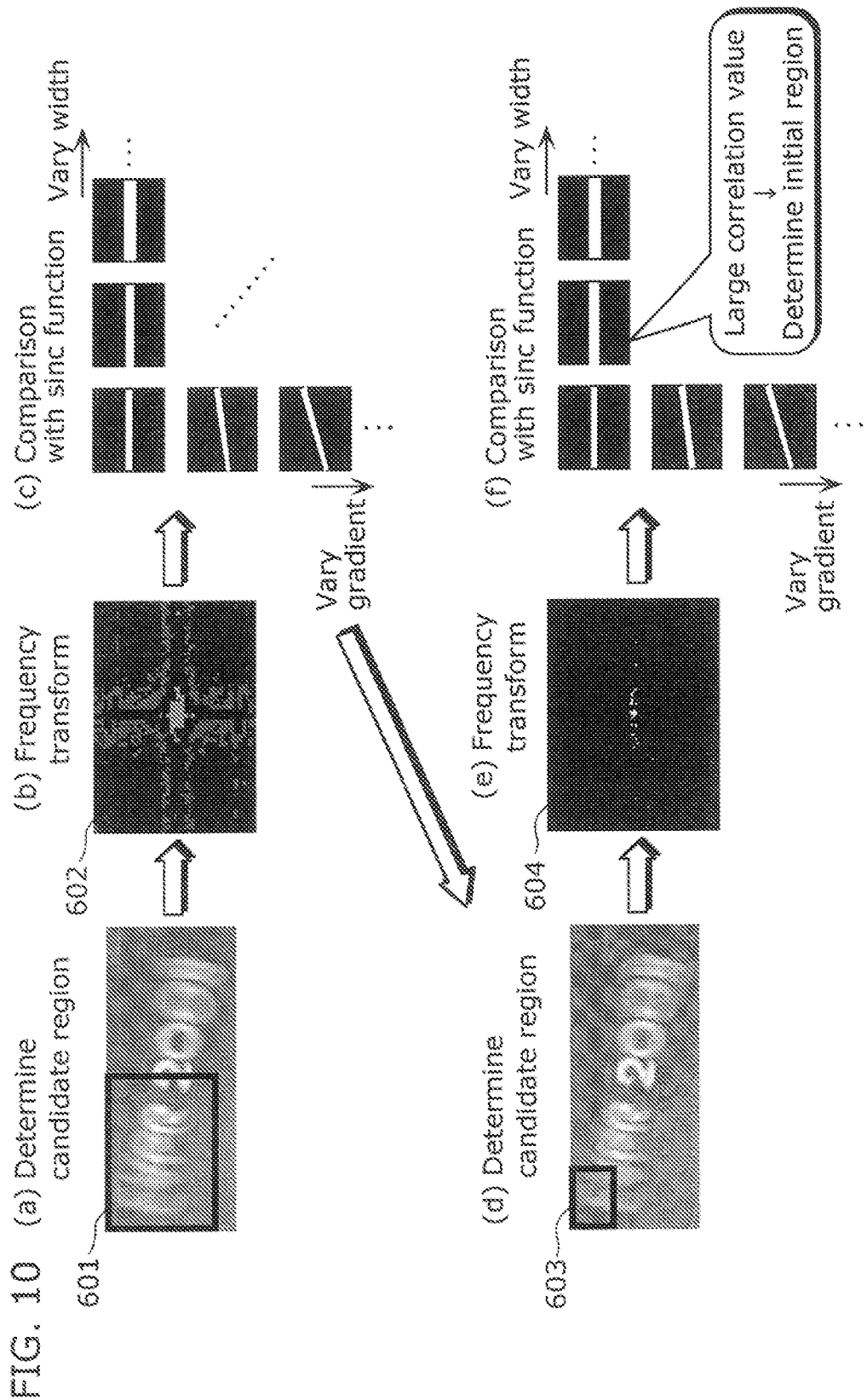
FIG. 10 illustrates the process flow for determination on an initial region by the first PSF calculation unit according to the first embodiment of the present invention.

FIG. 10 illustrates the process flow for the determination on the initial region by the first PSF calculation unit 111 according to the first embodiment of the present invention.

First, as shown in FIG. 10(a), the candidate region selection unit 111a selects, as a candidate region 601, a relatively large region which has not been determined as the adaptive region. The candidate region selection unit 111a may select a whole image as the candidate region.

Next, the blur direction determination unit 111b transforms the pixel values in the candidate region 601 into frequency components by the discrete Fourier transform or the like. FIG. 10(b) shows an image 602 representing the frequency components obtained by the transformation. The blur direction determination unit 111b then calculates correlation values of multiple images which correspond to respective sinc functions of multiple amplitudes and phases, and the image 602 representing the frequency components obtained by the transformation, as shown in FIG. 10(c).

Because the candidate region 601 includes multiple blur directions, the image 602 shown in FIG. 10(b) is an image in which points representing the frequency components are spread vertically and horizontally. Accordingly, the correlation values of the image 602 and the images corresponding to the sinc functions are small. That is, there is no image which is similar to the image 602 and corresponds to the sinc functions.

The blur direction determination unit 111b therefore determines that the blur in the candidate region 601 is not unidirectional. The candidate region selection unit 111a then selects, as a new candidate region 603, a region which is smaller than the candidate region 601, as shown in FIG. 10(d). The blur direction determination unit 111b then transforms the pixel values in the candidate region 603 into frequency components by the discrete Fourier transform or the like. FIG. 10(b) shows an image 604 representing the frequency components obtained by the transformation. The blur direction determination unit 111b then calculates correlation values of multiple images which correspond to respective sinc functions of multiple amplitudes and phases, and the image 604 representing the frequency components obtained by the transformation, as shown in FIG. 10(f).

Because the blur in the candidate region 603 is unidirectional, the image 604 shown in FIG. 10(e) is an image in which points representing the frequency components are arranged in one straight line. Accordingly, the correlation values of the image 604 and the images corresponding to the sinc functions are large. That is, there is an image which is similar to the image 604 and corresponds to the sinc functions. The blur direction determination unit 111b therefore determines that the blur in the candidate region 603 is unidirectional. The initial region determination unit 111c then determines the candidate region 603 as the initial region.

The first PSF calculation unit 111 thus determines the initial region based on whether or not the frequency distribution can be represented by the sinc function, thereby enabling determination on whether the gradation is due to texture or blur.

As above, the image correction apparatus 100 according to the present embodiment is capable of dividing an input image into multiple adaptive regions so that the regions having blur in common form one adaptive region. As a result, the image correction apparatus 100 can correct the input image using a PSF for each set of regions having blur in common, allowing accurate correction on an input image containing multiple kinds of blur, and thus obtaining a target image with less blur than the input image. Furthermore, the image correction apparatus 100 is capable of correcting the PSF for a pixel between the representative pixels with the use of the PSF calculated for each region, thereby allowing a reduction in the feeling of strangeness in the target image which is provoked by discontinuous PSFs at a boundary of the regions obtained by the division. In addition, the image correction apparatus 100 is capable of correcting an input image without using images other than the input image.

Moreover, the image correction apparatus 100 is capable of dividing an input image into adaptive regions so that the regions having similar blur form one adaptive region. Accordingly, the image correction apparatus 100 is capable of dividing one input image obtained by capturing an image of multiple subjects moving in different directions, into regions which correspond to the respective subjects. This means that the image correction unit 130 is capable of correcting the input image with the use of a PSF which matches the blur direction of each of the subject images, with the result that the image correction apparatus 100 can generate a target image with less blur.

Furthermore, the image correction apparatus 100 is capable of determining a region with unidirectional blur as an initial region for determining an adaptive region, thereby allowing a reduction in the possibility that the adaptive region will include subject images with blur in different directions. This means that the image correction apparatus 100 is capable of correcting the input image with the use of a PSF which matches the blur direction of the subject image, therefore being capable of generating a target image with less blur.

The PSF interpolation unit 120 does not interpolate PSFs in the adaptive regions whose PSFs are not similar to each other. The PSF interpolation unit 120 can therefore reduce the possibility that PSFs will be interpolated at a boundary of images of subjects which make different movements. This means that the PSF interpolation unit 120 allows a reduction in the possibility of interpolating a PSF which corresponds to movement different from the actual movement of the subject.

While the adaptive region division unit 110 determines the adaptive region so that the regions having similar PSFs form one region in the present embodiment, the image correction apparatus 100 implemented by the present invention is not limited to the above image correction apparatus. For example, the adaptive region division unit 110 may divide an input image into multiple adaptive regions which have blur in common, based on the prospective knowledge that similar textures are highly likely to make the same movement. Alternatively, the adaptive region division unit 110 may divide an input image into multiple adaptive regions which have blur in common, for example, with the additional use of a region division method (such as graph cuts) applied in the field of the computer vision. This allows the adaptive region division unit 110 to perform flexible texture division.

In the case where characteristics of an input image are known such as small movement in multiple images (in the case of a group photo or the like with less movement), it may be possible that the image correction apparatus 100 extracts, using, for example, a difference between images, only regions with some movement from the multiple images captured with a prolonged exposure time, and performs the above-described PSF interpolation and image correction only on the extracted regions. By so doing, the image correction apparatus 100 can reduce the total calculation cost, memory cost, or the like.

Furthermore, while the first PSF calculation unit 111 determines the initial region by reducing a size of the candidate region in the present embodiment, a region having a predetermined size which corresponds to the exposure time for the input image may be determined as the initial region, for example. In this case, it is preferable that a table which associates an exposure time with a size of the region be stored in the data storage unit 106. The first PSF calculation unit 111 then preferably refers to the table stored in the data storage unit 106, thereby obtains the size of the region which corresponds to the exposure time for the input image, and determines, as the initial region, the region having the obtained size.

Second Embodiment

Next, the second embodiment of the present invention is described with reference to the drawings.

An image correction apparatus 200 according to the second embodiment is composed of the same constituent elements as the image correction apparatus 100 according to the first embodiment except the adaptive region division unit included in the program storage unit 107, which is different in structure. In the following, a block diagram of which structure is the same as that provided in the first embodiment and a flowchart of which process flow is the same as that provided in the first embodiment are not illustrated nor explained. Furthermore, the constituent elements having the same functions as those in the first embodiment are denoted by the same numerals and not explained.

Figure 11:
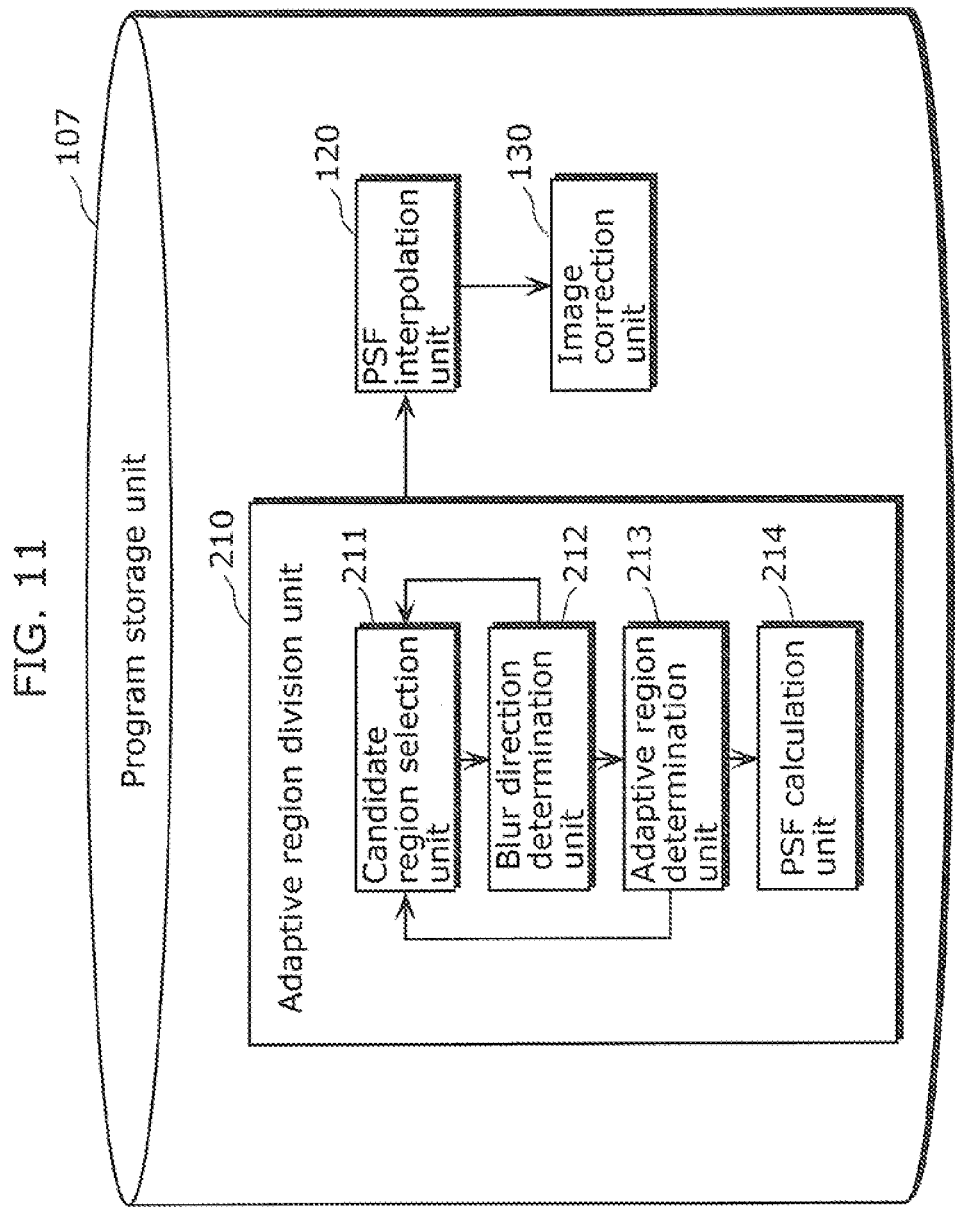
FIG. 11 is a block diagram showing a function structure of a program storage unit according to the second embodiment of the present invention.

FIG. 11 is a block diagram showing a function structure of the program storage unit 107 according to the second embodiment of the present invention.

The adaptive region division unit 210 according to the present embodiment determines regions having blur in common as one adaptive region based on whether or not the blur is unidirectional. As shown in FIG. 11, the adaptive region division unit 210 includes a candidate region selection unit 211, a blur direction determination unit 212, an adaptive region determination unit 213, and a PSF calculation unit 214.

The candidate region selection unit 211 determines a candidate region which is a whole or partial region of the input image. In the case where the blur direction determination unit 212 determines that the blur is not unidirectional, the candidate region selection unit 211 selects, as a new candidate region, a region smaller than the candidate region.

The blur direction determination 212 determines whether or not the blur in the candidate region selected by the candidate region selection unit 211 is unidirectional.

In the case where the blur direction determination unit 212 determines that the blur is unidirectional, the adaptive region determination unit 213 determines the candidate region as the adaptive region. That is, the adaptive region division unit 213 determines regions having blur in common as one adaptive region based on whether or not the blur is unidirectional.

The PSF calculation unit 214 calculates the PSF of the adaptive region determined by the adaptive region determination unit 213.

Next, operations of the adaptive region division unit 210 configured as above are described.

Figure 12:
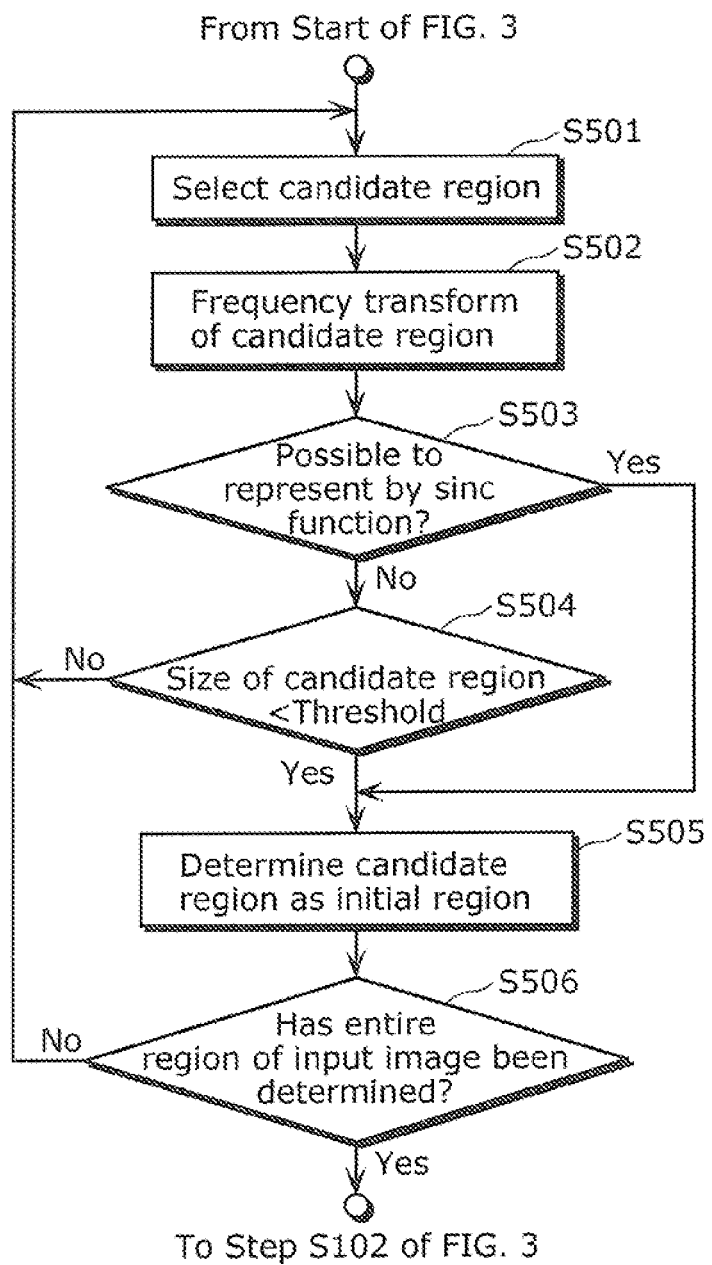
FIG. 12 is a flowchart showing a process flow of an adaptive region division unit according to the second embodiment of the present invention.

FIG. 12 is a flowchart showing a process flow (S101) of the adaptive region division unit 210 according to the second embodiment of the present invention.

First, the candidate region selection unit 211 selects a whole or partial region of the input image as a candidate region (S501). Subsequently, the blur direction determination unit 212 transforms pixel values of the selected candidate region into frequency domain by the discrete Fourier transform or the like (S502).

The blur direction determination unit 212 then determines whether or not a frequency distribution which is obtained by the transformation into frequency domain can be represented by the sinc function (S503). That is, the blur direction determination unit 212 determines whether or not the blur in the candidate region is unidirectional.

Specifically, the blur direction determination unit 212 calculates correlation values of multiple sinc functions and the frequency distribution which is obtained by the transformation into frequency domain. The multiple sinc functions herein indicate sinc functions which correspond to respective combinations of multiple amplitudes and multiple phases. To calculate the correlation values, the blur direction determination unit 212 uses L1 norm, L2 norm, or a method of calculating a similarity between images such as the normalized correlation.

The blur direction determination unit 212 then determines whether or not, among the multiple sinc functions, there is a sinc function in which the correlation values exceed a predetermined threshold. When there is a sinc function in which the correlation values exceed the predetermined threshold, the blur direction determination unit 212 determines that the frequency distribution can be represented by the sinc function. On the other hand, when there is no sinc function in which the correlation values exceed the predetermined threshold, the blur direction determination unit 212 determines that the frequency distribution cannot be represented by the sinc function.

When it is determined that the frequency distribution can be represented by the sinc function (Yes in S503), the adaptive region determination unit 213 determines the candidate region as the adaptive region (S505) because the blur in the candidate region is unidirectional.

On the other hand, when it is determined that the frequency distribution cannot be represented by the sinc function (No in S503), the adaptive region determination unit 213 does not determine the candidate region as the adaptive region because the blur in the candidate region is not unidirectional. In this case, the blur direction determination unit 212 determines whether or not the size of the candidate region is smaller than a predetermined threshold (S504). The predetermined threshold herein is a value indicating a size of a region from which PSF enabling correction on blur in an input image can be calculated accurately. This size of the region depends on an exposure time in capturing the image. For example, when the exposure time is around one second, the threshold is a value around 100 pixels (10×10 pixels).

When it is determined that the size of the candidate region is equal to or larger than the predetermined threshold (No in S504), the candidate region selection unit 211 selects, as a new candidate, a region which is smaller than the current candidate region (S501).

On the other hand, when it is determined that the size of the candidate region is smaller than the predetermined threshold (Yes in S504), the adaptive region determination unit 213 determines the currently selected candidate as the adaptive region (S505). This is because, when the candidate region is small, the subject image included in the candidate region is considered to be an image of a single subject. In other words, because the subject image included in the candidate region is considered to be an image of a single subject which moved in multiple directions, the adaptive region determination unit 213 does not downsize the candidate region but determines the currently selected candidate region as the adaptive region.

As above, the first PSF calculation unit 111 determines the adaptive region by reducing a size of the candidate region until it is determined that the frequency distribution can be represented by sinc function or until the candidate region has the predetermined size. The first PSF calculation unit 111 is therefore capable of determining, as the adaptive region, a region which does not include the PSFs of different blur directions.

The reason why whether or not the blur is unidirectional is used as a criterion for determining the adaptive region by reducing a size of the candidate region as above is that, because a relatively large region is selected first as the candidate region, there is a high possibility that an image of multiple subjects moving in different directions is included in the candidate region. In other words, that is because, in determining an adaptive region by reducing a size of the candidate region, determining an adaptive region based on the similarity between the PSFs leads to a high possibility that a region including PSFs of different blur directions is determined as an adaptive region.

As above, the image correction apparatus 200 according to the present embodiment is capable of determining the regions with unidirectional blur as the adaptive region, thereby being capable of preventing the input image from being divided in a manner that a region including an image of multiple subjects moving in different directions is determined as one adaptive region. This means that the image correction apparatus 200 is capable of correcting the input image with the use of a PSF which corresponds to the blur direction of the subject image, therefore being capable of generating a target image with less blur.

While the image correction apparatus according to an implementation of the present invention has been described above based on the embodiments, the present invention is not limited to these embodiments. The scope of the present invention includes other embodiments that are obtained by making various modification that those skilled in the art could think of, to the present embodiments, or by combining constituents in different embodiments.

Figure 13:
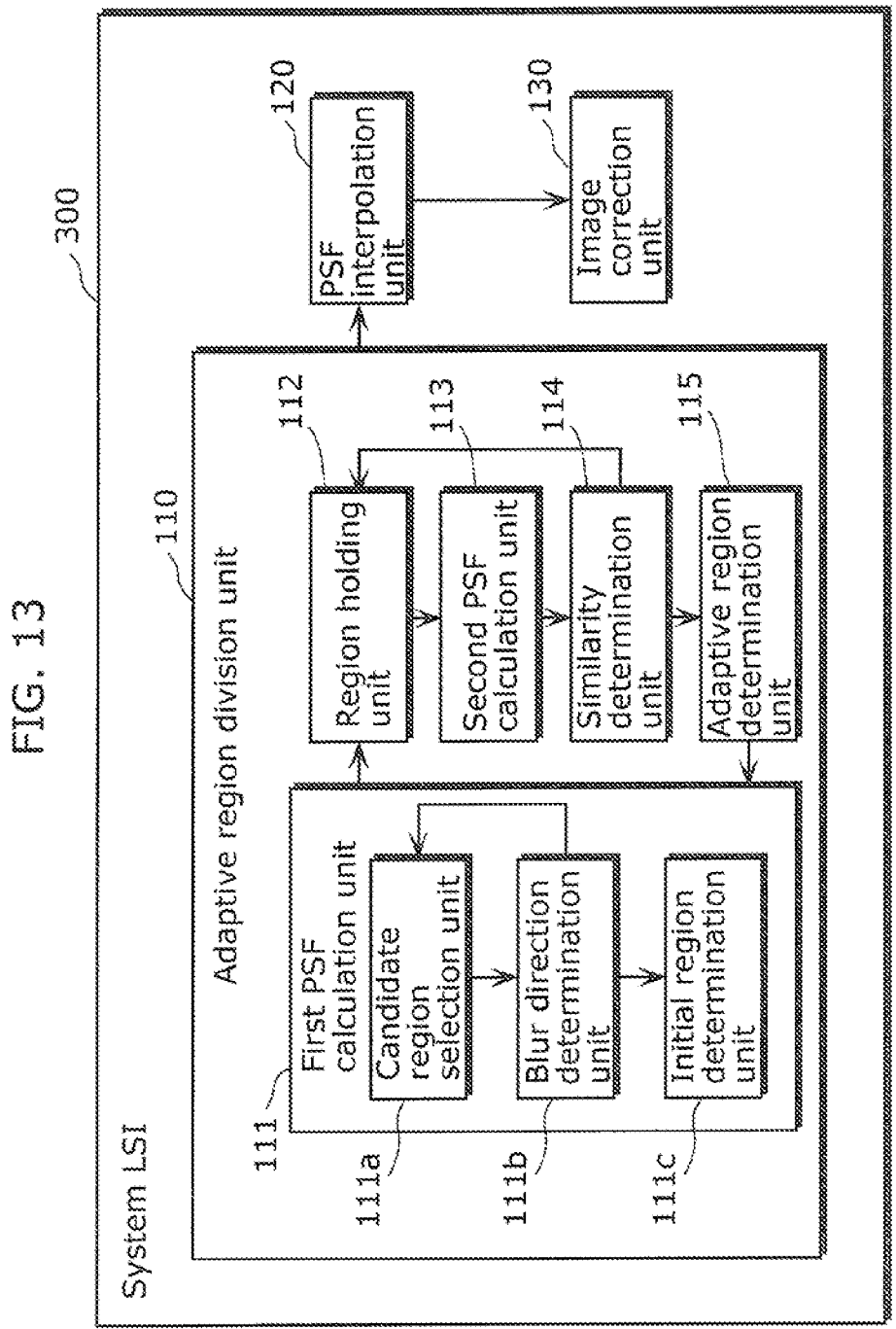
FIG. 13 is a block diagram showing a function structure of a system LSI according to the present invention.
Figure 14A:
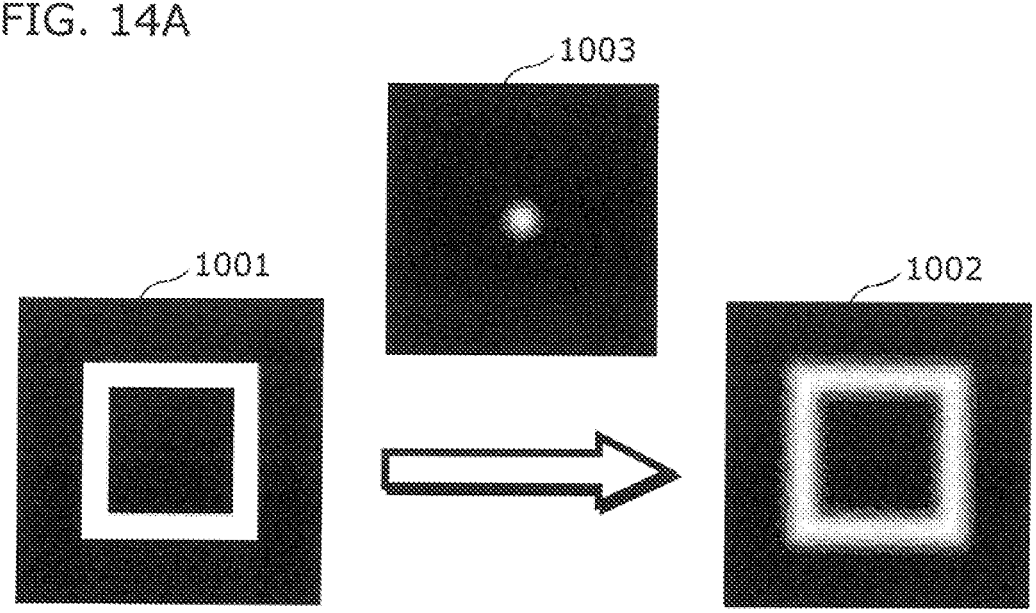
FIG. 14A illustrates a PSF.
Figure 14B:
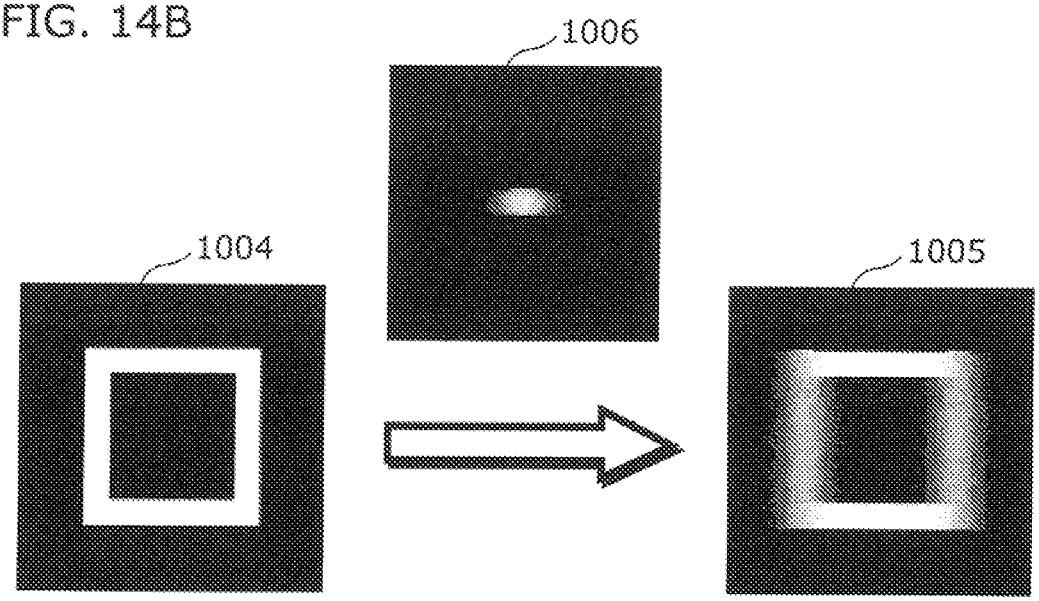
FIG. 14B illustrates a PSF.

For example, part or all of the elements included in the image correction apparatus according to the above embodiments may be provided in one system LSI (large scale integration). The system LSI is a super multifunctional LSI manufactured by integrating multiple components into one chip. Specifically, the system LSI is a computer system which includes a microprocessor, a read only memory (ROM), a random access memory (RAM) and so on. To be more specific, for example, as shown in FIG. 13, the adaptive region division unit 110, the PSF interpolation unit 120, and the image correction unit 130 may be included in one system LSI 300.

Furthermore, the present invention may be implemented as an image capturing apparatus which includes the image correction apparatus according to the above embodiments and an image capturing unit having an optical system, an imaging device, and so on.

INDUSTRIAL APPLICABILITY

The image correction apparatus according to an implementation of the present invention has a function for accurately correcting motion blur and is capable of improving sensitivity of digital still cameras or security cameras, therefore being useful for night photography, maintaining security with use of cameras in a dark environment, and the like.

REFERENCE SIGNS LIST 100, 200 Image correction apparatus
101 Calculation control unit
102 Memory unit
103 Display unit
104 Input unit
105 Communication I/F unit
106 Data storage unit
107 Program storage unit
108 Bus
110, 210 Adaptive region division unit
111 First PSF calculation unit
111a, 211 Candidate region selection unit
111b, 212 Blur direction determination unit
111c Initial region determination unit
112 Region holding unit
113 Second PSF calculation unit
114 Similarity determination unit
115, 213 Adaptive region division unit
120 PSF interpolation unit
130 Image correction unit
214 PSF calculation unit
300 System LSI
400 Camera

The invention claimed is:
1. An image correction apparatus which corrects an input image to generate a target image with less blur than the input image, said image correction apparatus comprising:
  an adaptive region division unit configured to divide the input image into a plurality of adaptive regions by determining regions having similar point spread functions as one adaptive region based on pixel values of pixels included in the input image, and to calculate a point spread function for each of the adaptive regions, the point spread functions each representing characteristics of image blur;
  a point spread function interpolation unit configured to interpolate, using the calculated point spread function, a point spread function for a pixel located between representative pixels each representing a corresponding one of the adaptive regions; and
  an image correction unit configured to correct the input image using the point spread functions available after the interpolation, so as to generate the target image.

2. The image correction apparatus according to claim 1, wherein said adaptive region division unit includes:
a first point spread function calculation unit configured to calculate, as a first point spread function, a point spread function of an initial region which is a partial region of the input image;
a region holding unit configured to hold the initial region as a holding region;
a second point spread function calculation unit configured to calculate, as a second point spread function, a point spread function of an evaluation region which is a region that includes and is larger than the initial region;
a similarity determination unit configured to determine whether or not the first point spread function and the second point spread function are similar; and
an adaptive region determination unit configured to determine the regions having blur in common as one adaptive region by determining, as the adaptive region, the holding region held last by said region holding unit, when said similarity determination unit determines that the first point spread function and the second point spread function are not similar,
said region holding unit is configured to hold the evaluation region as the holding region, when said similarity determination unit determines that the first point spread function and the second point spread function are similar, and
said second point spread function calculation unit is configured to calculate, as the second point spread function, a point spread function of a new evaluation region that includes and is larger than the evaluation region, when said similarity determination unit determines that the first point spread function and the second point spread function are similar.

3. The image correction apparatus according to claim 2, wherein said first point spread function calculation unit includes:
a candidate region selection unit configured to select a whole or partial region of the input image as a candidate region;
a blur direction determination unit configured to determine whether or not blur in the candidate region selected by said candidate region selection unit is unidirectional; and
an initial region determination unit configured to determine the candidate region as the initial region, when said blur direction determination unit determines that the blur is unidirectional, and
said candidate region selection unit is configured to select, as a new candidate region, a region which is smaller than the candidate region, when said blur direction determination unit determines that the blur is not unidirectional.

4. The image correction apparatus according to claim 1, wherein said adaptive region division unit is configured to determine the regions having blur in common as one adaptive region based on whether or not the blur is unidirectional.

5. The image correction apparatus according to claim 4, wherein said adaptive region division unit includes:
a candidate region selection unit configured to select a whole or partial region of the input image as a candidate region;
a blur direction determination unit configured to determine whether or not blur in the candidate region selected by said candidate region selection unit is unidirectional; and
an adaptive region determination unit configured to determine the region having blur in common as one adaptive region by determining the candidate region as the adaptive region, when said blur direction determination unit determines that the blur is unidirectional, and
said candidate region selection unit is configured to select, as a new candidate region, a region which is smaller than the candidate region, when said blur direction determination unit determines that the blur is not unidirectional.

6. The image correction apparatus according to claim 1, wherein, when at least two point spread functions of the calculated point spread functions are each represented by a straight line, said point spread function interpolation unit is configured to divide each of the at least two point spread functions into two or more parts, and to interpolate the point spread function for a pixel located between the representative pixels of the adaptive regions corresponding to the at least two point spread functions, based on a correspondence relationship obtained by associating the at least two point spread functions with each other using the divided point spread functions.

7. The image correction apparatus according to claim 6, wherein said point spread function interpolation unit is configured to determine whether or not the calculated point spread functions are similar to each other, and to interpolate a point spread function for a pixel located between the representative pixels of the adaptive regions each corresponding to one of the point spread functions determined as being similar to each other.

8. The image correction apparatus according to claim 1, wherein said point spread function interpolation unit is configured to interpolate the point spread function for a pixel located between the representative pixels of the adaptive regions each corresponding to one of the calculated point spread functions, based on a correspondence relationship obtained by associating the calculated point spread functions with each other by a matching method using dynamic programming.

9. The image correction apparatus according to claim 8, wherein said point spread function interpolation unit is configured to determine whether or not the calculated point spread functions are similar to each other, and interpolate a point spread function of a pixel located between the representative pixels of the adaptive regions each corresponding to one of the point spread functions determined as being similar to each other.

10. An image correction method of correcting an input image to generate a target image with less blur than the input image, said image correction method comprising:
dividing the input image into a plurality of adaptive regions by determining regions having similar point spread functions as one adaptive region based on pixel values of pixels included in the input image, and calculating a point spread function for each of the adaptive regions, the point spread functions each representing characteristics of image blur;
interpolating, using the calculated point spread function, a point spread function for a pixel located between representative pixels each representing a corresponding one of the adaptive regions; and
correcting the input image using the point spread functions available after said interpolating, so as to generate the target image.

11. An integrated circuit which corrects an input image to generate a target image with less blur than the input image, said image correction apparatus comprising:
an adaptive region division unit configured to divide the input image into a plurality of adaptive regions by determining regions having similar point spread functions as one adaptive region based on pixel values of pixels included in the input image, and to calculate a point spread function for each of the adaptive regions, the point spread functions each representing characteristics of image blur;

a point spread function interpolation unit configured to interpolate, using the calculated point spread function, a point spread function for a pixel located between representative pixels each representing a corresponding one of the adaptive regions; and an image correction unit configured to correct the input image using the point spread functions available after the interpolation, so as to generate the target image.

12. A non-transitory computer-readable medium having a program stored thereon which causes a computer to execute said image correction method according to claim 10.

* * * * *